(12) United States Patent
Hayashi et al.

(10) Patent No.: US 11,156,194 B2
(45) Date of Patent: Oct. 26, 2021

(54) END CAP

(71) Applicant: USUI CO., LTD., Shizuoka (JP)

(72) Inventors: Koichi Hayashi, Shizuoka (JP); Shuji Suzuki, Shizuoka (JP)

(73) Assignee: USUI CO., LTD., Shizuoka (JP)

( * ) Notice: Subject to any disclaimer, the term of this patent is extended or adjusted under 35 U.S.C. 154(b) by 380 days.

(21) Appl. No.: 16/325,706

(22) PCT Filed: Jun. 26, 2017

(86) PCT No.: PCT/JP2017/023404
§ 371 (c)(1),
(2) Date: Feb. 14, 2019

(87) PCT Pub. No.: WO2018/037703
PCT Pub. Date: Mar. 1, 2018

(65) Prior Publication Data
US 2020/0149502 A1     May 14, 2020

(30) Foreign Application Priority Data
Aug. 25, 2016    (JP) .............................. JP2016-164517

(51) Int. Cl.
*F02M 55/02*     (2006.01)
*F02M 55/00*     (2006.01)
*F16L 55/11*     (2006.01)

(52) U.S. Cl.
CPC .......... *F02M 55/005* (2013.01); *F02M 55/02* (2013.01); *F16L 55/11* (2013.01)

(58) Field of Classification Search
CPC ........ F02M 55/02; F02M 55/005; F16L 55/11
See application file for complete search history.

(56) References Cited

U.S. PATENT DOCUMENTS 5,511,527 A * 4/1996 Lorraine ................ F02B 75/22
123/456
2004/0118382 A1   6/2004 Usui et al.
(Continued)

FOREIGN PATENT DOCUMENTS

JP      2001-193599 A    7/2001
JP      2004-04-15 A     4/2004
(Continued)

OTHER PUBLICATIONS

International Search Report for PCT/JP2017/023404 dated Aug. 15, 2017.

*Primary Examiner* — Thomas N Moulis
(74) *Attorney, Agent, or Firm* — Yokoi & Co., U.S.A.; Toshiyuki Yokoi (57) ABSTRACT

To obtain a gasoline direct injection rail in which a large load is unlikely to be concentrated on a boundary part between a rail body and an end cap, and damage to the boundary part can be prevented, even when high pressure is applied to the inside of the rail body. The gasoline direct injection rail comprises an end cap 4 composed of a top plate 5 and a circumferential wall 6, and a rail body 1 having an end part 2 in which the circumferential wall 6 of the end cap 4 is inserted and placed, wherein an inner circumference of the end part 2 of the rail body 1 has a depression 3, the circumferential wall 6 is placed in the depression 3, and there is no level difference at a boundary part 12 between an inner circumferential surface 11 of the circumferential wall 6 and an inner circumferential surface 10 of the rail body 1.

4 Claims, 8 Drawing Sheets

(56) References Cited

U.S. PATENT DOCUMENTS

| | | | | |
|---|---|---|---|---|
| 2006/0163243 | A1* | 7/2006 | Stieler | B29C 66/12441 |
| | | | | 219/607 |
| 2014/0014068 | A1* | 1/2014 | Ramamurthy | F16L 55/04 |
| | | | | 123/456 |
| 2015/0007796 | A1* | 1/2015 | Schulte | F02M 63/0275 |
| | | | | 123/456 |
| 2016/0341167 | A1* | 11/2016 | Zdroik | F02M 63/0275 |
| 2017/0051715 | A1* | 2/2017 | McCune | F02M 59/102 |
| 2017/0122277 | A1* | 5/2017 | Suzuki | F02M 55/02 |
| 2017/0122278 | A1* | 5/2017 | Asahi | F02M 55/04 |
| 2017/0159626 | A1* | 6/2017 | Asahi | F02M 55/025 |
| 2018/0119657 | A1* | 5/2018 | Suzuki | F16L 55/1108 |
| 2018/0347527 | A1* | 12/2018 | Suzuki | F02M 63/0225 |
| 2019/0093613 | A1* | 3/2019 | Horstmann | F02M 41/16 |
| 2019/0264643 | A1* | 8/2019 | Murofushi | F02M 55/005 |

FOREIGN PATENT DOCUMENTS

| | | |
|---|---|---|
| JP | 2004-116334 A | 4/2004 |
| JP | 2016-037928 A | 3/2016 |
| KR | 2012-0097251 A | 9/2012 |
| KR | 2016-0069534 A | 6/2016 |

* cited by examiner

Related Art

Figure 7

Related Art

Figure 8

END CAP

TECHNICAL FIELD

The present invention relates to a gasoline direct injection rail in which an end cap is securely placed in an end part of a rail body.

BACKGROUND ART

Figure 7:
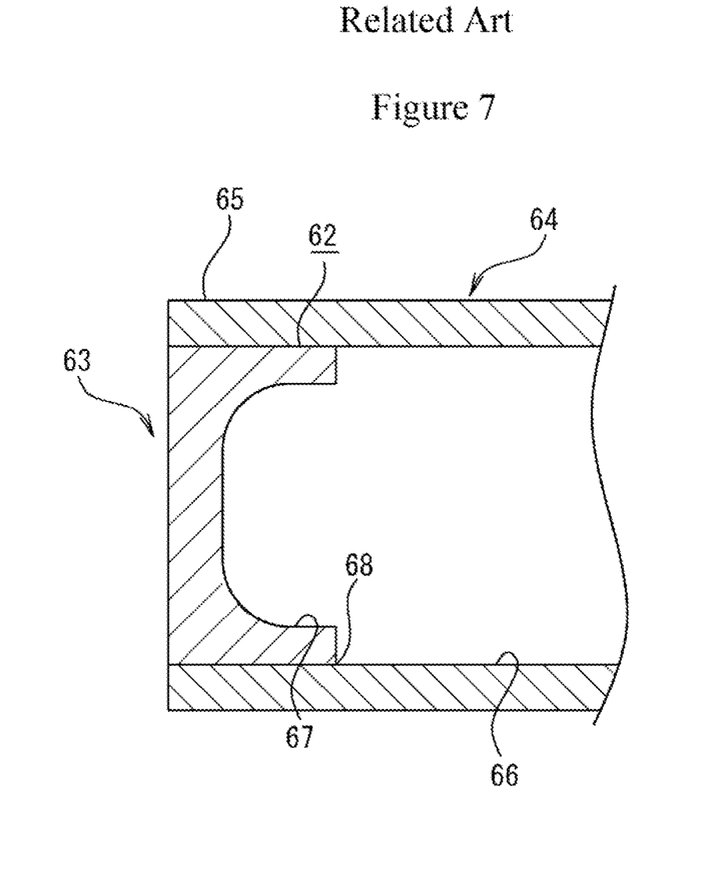
FIG. 7 is a partially enlarged cross-sectional view showing a conventional example.

To date, a gasoline direct injection rail is known in which an end cap is inserted into and placed in an end part of a rail body as set forth in Patent Literature 1. Among such conventional gasoline direct injection rails, a gasoline direct injection rail provided with an end cap (63) that has a U-shaped cross section and that is composed of a top plate (61) and a circumferential wall (62) as shown in FIG. 7 is already in use. In this gasoline direct injection rail, the circumferential wall (62) of the end cap (63) is securely placed on the inner circumference of an end part (65) of a rail body (64) by brazing.

CITATION LIST

Patent Literature

Patent Literature 1: JP 2016-37928A

DISCLOSURE OF THE INVENTION

Problems to be Solved by the Invention

However, in the commonly used conventional end cap (63) having a U-shaped cross section, the peripheral wall (62) has a large thickness. Accordingly, when the peripheral wall (62) of the end cap (63) is securely placed on the inner circumference of the end part (65) of the rail body (64), a large level difference is formed at a boundary part (68) between an inner circumferential surface (66) of the rail body (64) and an inner circumferential surface (67) of the circumferential wall (62).

Figure 8:
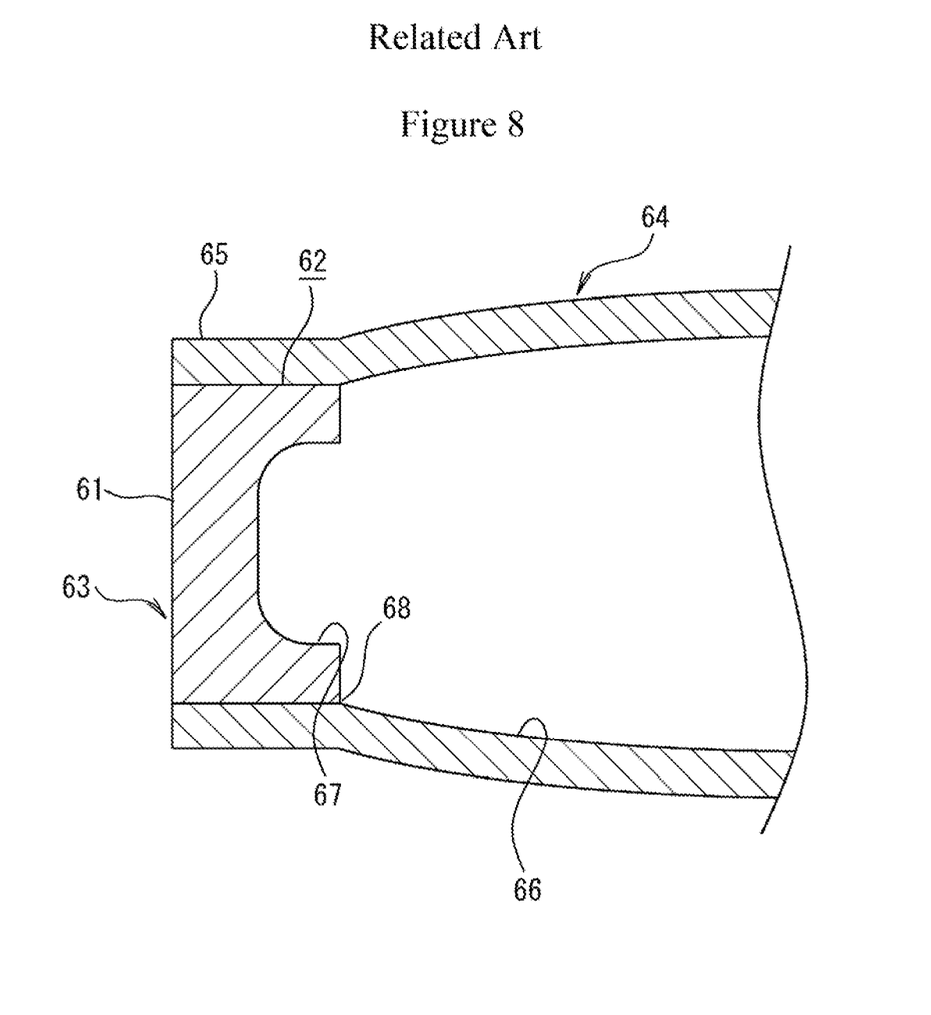
FIG. 8 is a partially enlarged cross-sectional view when pressure is applied with regard to FIG. 7.

Accordingly, when pressure is applied to the inside of the rail main body (64) having such a large level difference, the rail body (64) deforms as shown in FIG. 8 at the portion where the level difference is. That is to say, the rail body (64) expands and deforms in the radial direction due to the applied pressure, and therefore an excessive load is concentrated on the boundary part (68) between the inner circumferential surface (66) of the rail body (64) and the inner circumferential surface (67) of the circumferential wall (62). Accordingly, with high-pressure gasoline direct injection systems of the future that provide increased fuel pressure, an even larger load will be concentrated on the boundary part (68), and therefore the rail body (64) may be damaged from the boundary part (68).

Accordingly, the present invention solves the above-described problem and provides a gasoline direct injection rail in which a large load is unlikely to be concentrated on a boundary part between a rail body and an end cap, and damage to the boundary part can be prevented, even when high pressure is applied to the inside of the rail body.

Means for Solving the Problem

The first invention of the present application solves the above-described problem and provides a gasoline direct injection rail comprising an end cap composed of a top plate and a circumferential wall, and a rail body having an end part in which the circumferential wall of the end cap is inserted and placed, wherein an inner circumference of the end part of the rail body has a depression, the circumferential wall is placed in the depression, and there is no level difference at a boundary part between an inner circumferential surface of the circumferential wall and an inner circumferential surface of the rail body.

Due to the structure in which there is no level difference at the boundary part between the inner circumferential surface of the rail body and the inner circumferential surface of the circumferential wall, a load is unlikely to be concentrated on the boundary part when pressure is applied to the rail body. Accordingly, damage to the boundary part can be prevented even when high pressure is applied.

Moreover, the second invention of the present application is a gasoline direct injection rail comprising an end cap composed of a top plate and a circumferential wall, and a rail body having an end part in which the circumferential wall of the end cap is inserted and placed, wherein the circumferential wall of the end cap is positioned on an inner circumference of the end part of the rail body, and a value of h/T is $0 < h/T \leq 0.25$ where h represents a level difference formed at a boundary part between an inner circumferential surface of the circumferential wall and an inner circumferential surface of the rail body, and T represents a thickness of the rail body.

Figure 6:
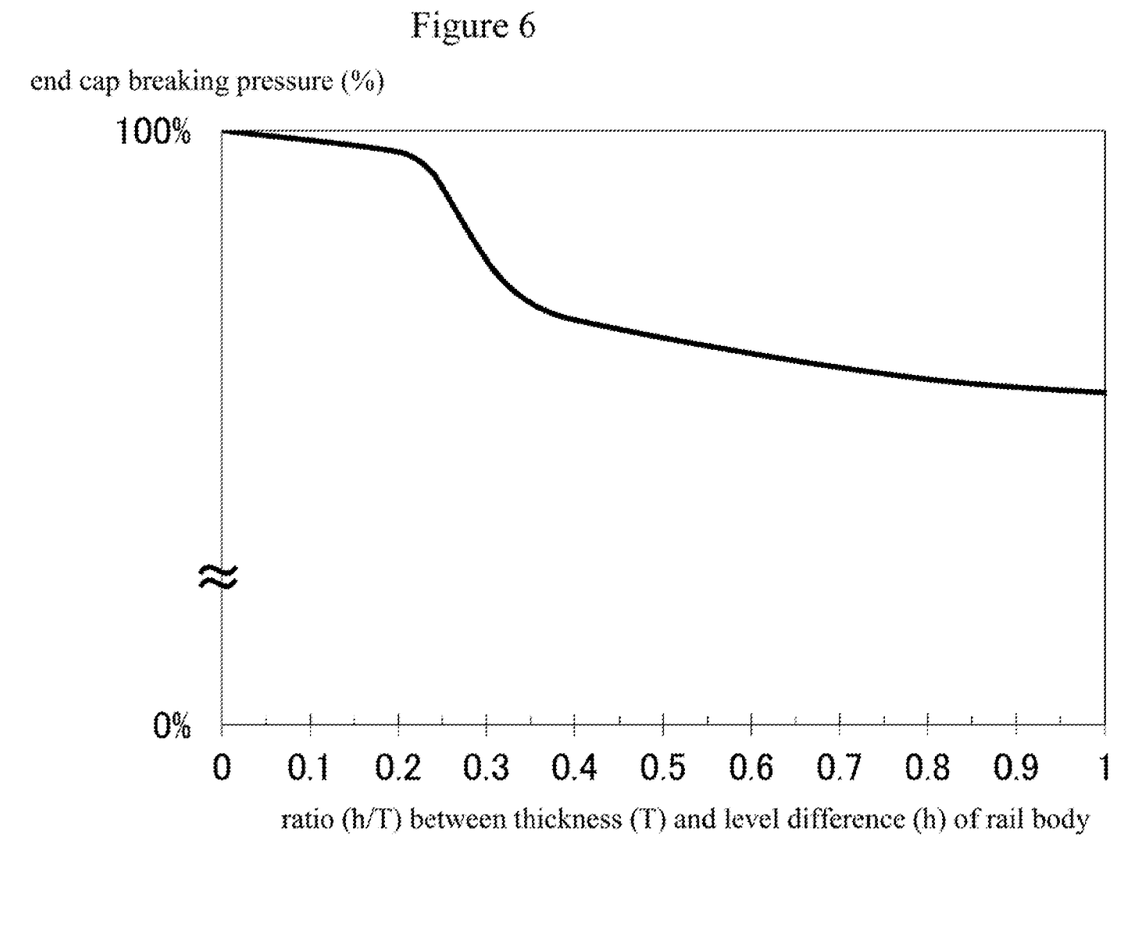
FIG. 6 is a graph showing test results.

Here, a test concerning correlation between the h/T value and the end cap breaking pressure was carried out, where h represents a level difference formed at the boundary part between the inner circumferential surface of the circumferential wall and the inner circumferential surface of the rail body, and T represents the thickness of the rail body. The "end cap breaking pressure" means pressure necessary for breaking the end cap and means a ratio to the breaking pressure at h/T=0 at which there is no level difference at the boundary part between the inner circumferential surface of the rail main body and the inner circumferential surface of the circumferential wall being 100%. The results of this test are shown in FIG. 6. The results of this test made it clear that when h/T is in the range of $\leq 0.25$, the end cap breaking pressure shows 90% or greater and is markedly increased.

From the above results, by configuring the h/T value to be $0 < h/T \leq 0.25$, a load is unlikely to be concentrated on the boundary part when pressure is applied to the rail body. Accordingly, damage to the boundary part can be prevented even when high pressure is applied.

The circumferential wall of the end cap may be placed on the inner circumferential surface of the end part of the rail body. Accordingly, processing on the inner circumference of the rail body is not necessary, and thus manufacturing can be facilitated.

The rail body may have a depression in the inner circumference of the end part, the circumferential wall of the end cap may be placed in the depression, and a level difference may be provided between the inner circumferential surface of the rail body and the inner circumferential surface of the circumferential wall. Accordingly, the level difference at the boundary part can be lowered by the depression of the rail body even when the circumferential wall of the end cap is formed to be thick, and therefore the end cap to be used can be strong.

Effects of the Invention

As described above, the first and second inventions of the present application are structured such that there is no level difference at the boundary part between the inner circumferential surface of the rail body and the inner circumferential surface of the circumferential wall or that the value of h/T is 0<h/T≤0.25 where h represents the level difference formed at the boundary part between the inner circumferential surface of the circumferential wall and the inner circumferential surface of the rail body, and T represents a thickness of the rail body, and therefore a situation can be avoided in which a load is concentrated on the boundary part when pressure is applied to the rail body. Accordingly, damage to the boundary part between the inner circumferential surface of the circumferential wall and the inner circumferential surface of the rail body can be prevented even when high pressure is applied to the inside of the rail body.

MODES FOR CARRYING OUT THE INVENTION

First Embodiment

Figure 1:
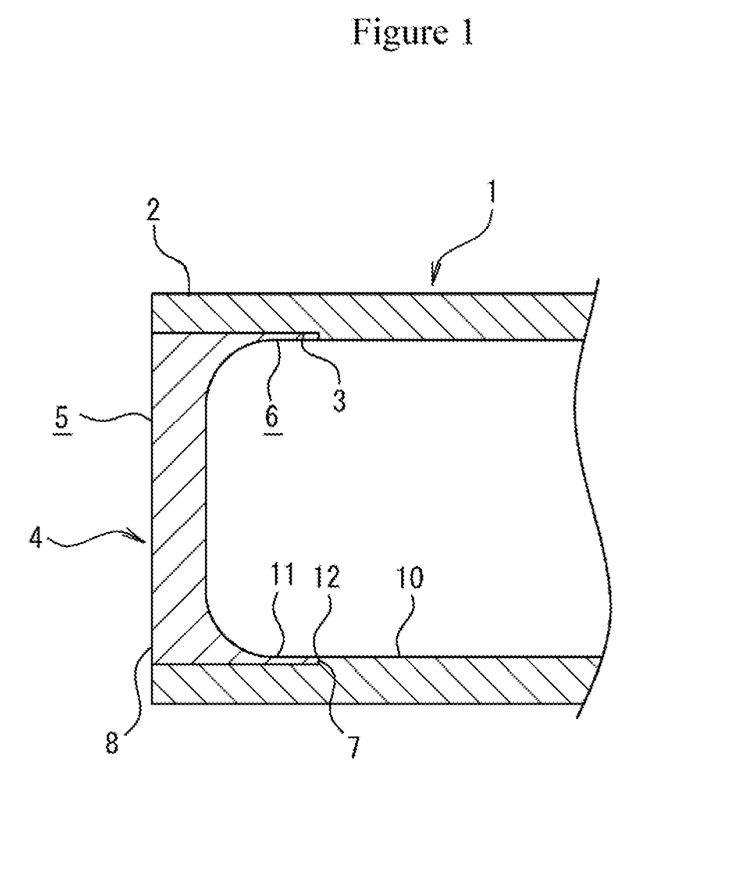
FIG. 1 is a partially enlarged cross-sectional view showing the first embodiment of the present application.

The first embodiment, which is the first invention of the present application, will now be described below with reference to FIGS. 1 and 2. First, (1) denotes a cylindrical rail body, and an annular depression (3) having an L-shaped cross section is provided in the inner circumference of an end part (2) of the rail body (1). An end cap (4) is securely placed on the end part (2) of the rail body (1). The end cap (4) is composed of a top plate (5) and a circumferential wall (6), and the thickness of the circumferential wall (6) has substantially the same size as the depth of the depression (3). Moreover, the height of the end cap (4) formed from an end surface (7) of the circumferential wall (6) to a surface (8) of the top plate (5) has substantially the same size as the length of the depression (3) formed in the axial direction.

The circumferential wall (6) of the end cap (4) formed as described above is inserted into and placed in the depression (3) in the rail body (1) until the end surface (7) of the circumferential wall (6) is brought into contact with the step of the depression (3).

Accordingly, the circumferential wall (6) is positioned in the depression (3) in the rail body (1), also the aforementioned thickness has substantially the same size as the depth of the depression (3), and therefore a structure can be formed in which there is no level difference at a boundary part (12) between an inner circumferential surface (10) of the rail body (1) and an inner circumferential surface (11) of the end cap (4).

Figure 2:
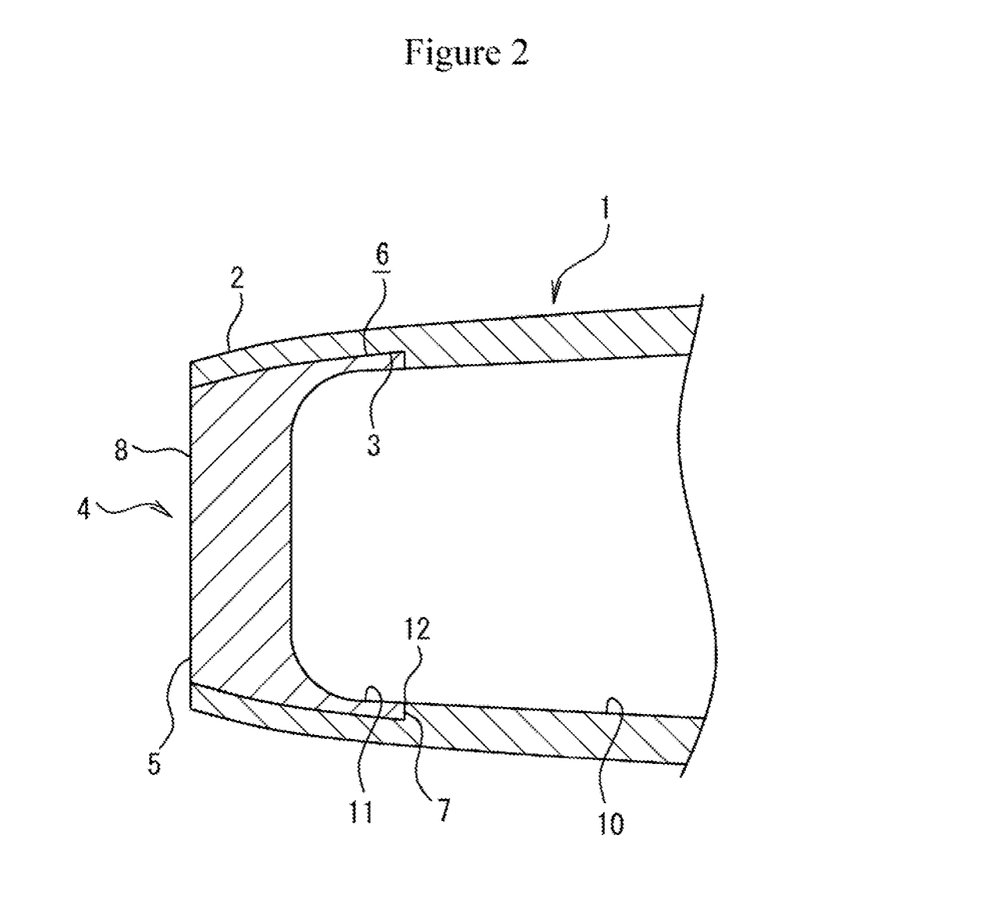
FIG. 2 is a partially enlarged cross-sectional view when pressure is applied with regard to FIG. 1.

Thus, the rail body (1) will expand in the radial direction when pressure is applied to the rail body (1) as shown in FIG. 2. However, since no level difference is formed at the boundary part (12) between the inner circumferential surface (10) of the rail body (1) and the inner circumferential surface (11) of the circumferential wall (6), a situation in which a load is concentrated on the boundary part (12) is unlikely to be created. Accordingly, even with high-pressure gasoline direct injection systems of the future that provide increased fuel pressure, damage to the boundary part (12) resulting from application of high pressure can be prevented.

Second Embodiment

Figure 3:
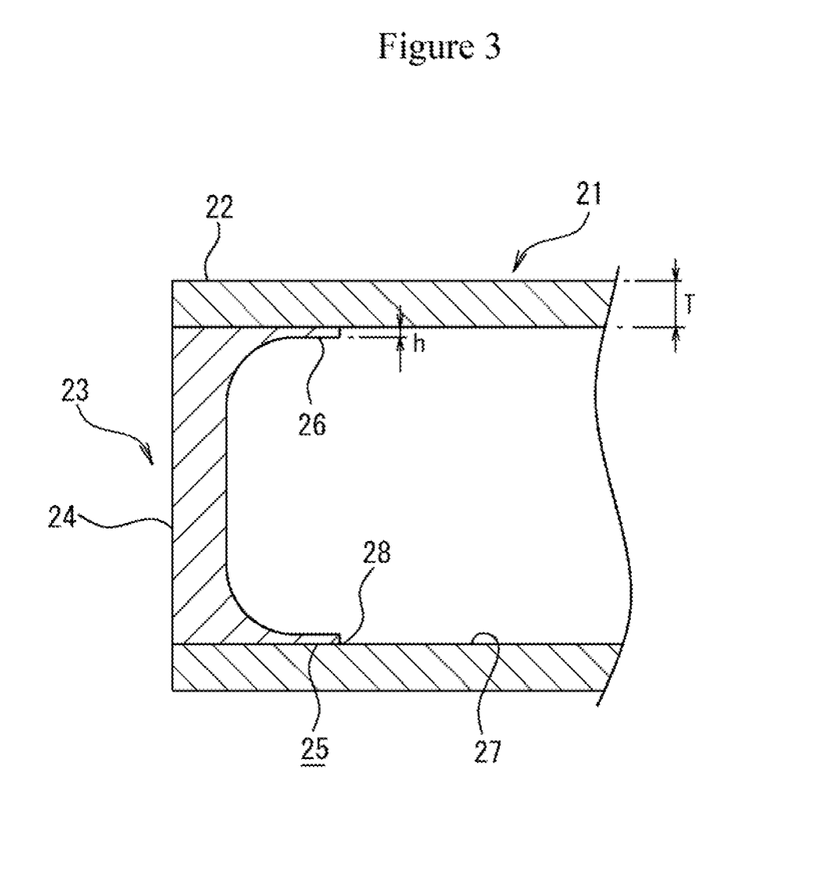
FIG. 3 is a partially enlarged cross-sectional view showing the second embodiment.

While the circumferential wall (6) of the end cap (4) is inserted into and placed in the depression (3) of the rail body (1) in the first embodiment, a rail body (21) has no depression in the present embodiment. As for the second embodiment described below, which is the second invention of the present application, the rail body (21) of the present embodiment is cylindrical and, as shown in FIG. 3, processing such as forming a depression or the like is not performed on the inner circumferential surface (27). An end cap (23) is securely placed on the inner circumference of an end part (22) of the rail body (21). The end cap (23) is composed of a top plate (24) and a circumferential wall (25), and the circumferential wall (25) is inserted into and placed on the inner circumference of the end part (22) of the rail body (21).

Figure 4:
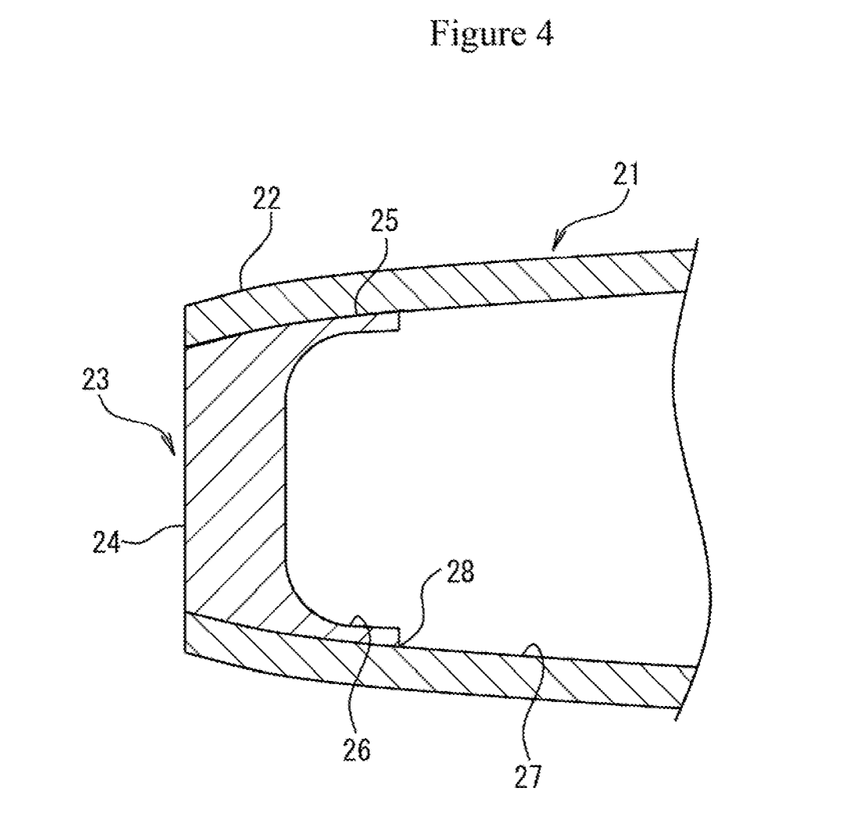
FIG. 4 is a partially enlarged cross-sectional view when pressure is applied with regard to FIG. 3.

As shown in FIG. 3, the value of h/T is 0.2 where h represents the level difference between the inner circumferential surface (26) of the circumferential wall (25) and the inner circumferential surface (27) of the rail body (21), and T represents the thickness of the rail body (21). Since the value of h/T is within the range of 0<h/T≤0.25 in the present embodiment, the rail body (21) will expand in the radial direction when pressure is applied to the inside of the rail body (21) as shown in FIG. 4; however, a load is unlikely to be concentrated on a boundary part (28) between the inner circumferential surface (26) of the circumferential wall (25) and the inner circumferential surface (27) of the rail body (21). Accordingly, even with high-pressure gasoline direct injection systems of the future that provide increased fuel pressure, damage to the boundary part (28) resulting from application of high pressure can be prevented.

Moreover, as described above, since the peripheral wall (25) of the end cap (23) is placed without forming a depression in the inner circumferential surface (27) of the rail body (21), processing on the inner circumference of the rail body (21) is not necessary, and thus manufacturing can be facilitated.

Third Embodiment

Figure 5:
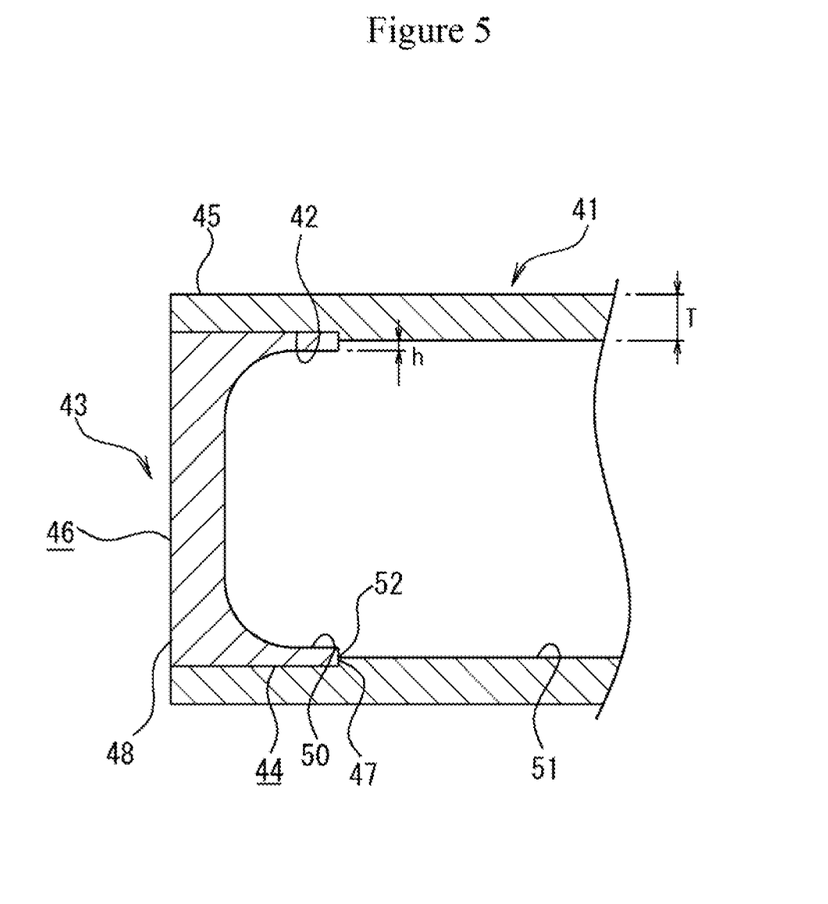
FIG. 5 is a partially enlarged cross-sectional view showing the third embodiment.

In the second embodiment, the circumferential wall (25) of the end cap (23) is inserted into and placed in the rail body (21) in which no depression is formed, but in the third embodiment, which is the second invention of the present application, a depression (42) is provided in a rail body (41), and a circumferential wall (44) of an end cap (43) is inserted into and placed in the depression (42).

For a description of the present embodiment, the annular depression (42) having an L-shaped cross section is provided in an inner circumference (51) of the rail body (41) of the present embodiment. The end cap (43) is securely placed on an end part (45) of the rail body (41). The end cap (43) is composed of a top plate (46) and the circumferential wall (44), and the height of the end cap (43) formed from an end surface (47) of the circumferential wall (44) to a surface (48) of the top plate (46) has substantially the same size as the length of the depression (42) formed in the axial direction.

As shown in FIG. 5, the value of h/T is 0.2 where h represents the level difference between an inner circumferential surface (50) of the circumferential wall (44) and an inner circumferential surface (51) of the rail body (41), and T represents the thickness of the rail body (41). Since the value of h/T is within the range of 0<h/T≤0.25 in the present embodiment, a load is unlikely to be concentrated on a boundary part (52) between the inner circumferential surface (50) of the circumferential wall (44) and the inner circumferential surface (51) of the rail body (41) when pressure is applied to the inside of the rail body (41). Accordingly, even with high-pressure gasoline direct injection systems of the future that provide increased fuel pressure, damage to the boundary part (52) resulting from application of high pressure can be prevented.

Moreover, as described above, since the depression (42) is formed in the inner circumference of the end part (45) of the rail body (41), and the circumferential wall (44) of the end cap (43) is placed in the depression 42, the level difference at the boundary part (52) can be small due to the depression (42) of the rail body (41) even when the peripheral wall (44) of the end cap (43) is formed so as to have a large thickness. Therefore, with the end cap (43) having increased strength, a highly pressure-resistant product can be obtained.

DESCRIPTION OF THE REFERENCE NUMERALS

- 1, 21, 41 Rail body
- 2, 22, 45 End part
- 3, 42 Depression
- 4, 23, 43 End cap
- 5, 24, 46 Top plate
- 6, 25, 44 Circumferential wall
- 10, 27, 51 Inner circumferential surface (rail body)
- 11, 26, 50 Inner circumferential surface (circumferential wall)
- 12, 28, 52 Boundary part

The invention claimed is:

1. A gasoline direct injection rail comprising:
an end cap composed of a top plate and a circumferential wall; and
a rail body having an end part in which the circumferential wall of the end cap is inserted and placed, wherein
the circumferential wall of the end cap is positioned on an inner circumference of the end part of the rail body, and a value of h/T is 0<h/T≤0.25 so that an end cap breaking pressure shows 90% or greater where h represents a level difference formed at a boundary part between an inner circumferential surface of the circumferential wall and an inner circumferential surface of the rail body, and T represents a thickness of the rail body,
an outer surface of the top plate of the end cap is aligned with the end part of the rail body without being protruded outside the end part of the rail body, and
the end cap breaking pressure means pressure necessary for breaking the end cap and means a ratio to a breaking pressure at h/T=0 at which there is no level difference at the boundary part between the inner circumferential surface of the rail body and the inner circumferential surface of the circumferential wall being 100%.

2. The gasoline direct injection rail according to claim 1, wherein the circumferential wall of the end cap is placed on the inner circumferential surface of the end part of the rail body.

3. The gasoline direct injection rail according to claim 1, wherein the rail body has a depression in the inner circumference of the end part, the circumferential wall of the end cap is placed in the depression, and a level difference is provided between the inner circumferential surface of the rail body and the inner circumferential surface of the circumferential wall.

4. The gasoline direct injection rail according to claim 1, wherein a depression is not formed in the inner circumferential surface of the rail body.

* * * * *